United States Patent [19]
Corrigan et al.

[11] Patent Number: 5,761,504
[45] Date of Patent: Jun. 2, 1998

[54] METHOD FOR UPDATING A SOFTWARE CODE IN A COMMUNICATION SYSTEM

[75] Inventors: Richard J. Corrigan, Schaumburg; Michael R. Mannette, Bloomingdale; Hang Chan, Bartlett; Naveen Grover, Des Plaines, all of Ill.

[73] Assignee: Motorola, Inc., Schaumburg, Ill.

[21] Appl. No.: 601,313

[22] Filed: Feb. 16, 1996

[51] Int. Cl.[6] ........................................ G06F 9/06
[52] U.S. Cl. ............................... 395/652; 395/712
[58] Field of Search ........................ 395/712, 651, 395/652, 653

[56] References Cited

U.S. PATENT DOCUMENTS 5,003,591  3/1991  Kauffman et al. .................. 380/10
5,388,211  2/1995  Hornbuckle .......................... 395/712
5,471,674  11/1995  Stewort et al. ...................... 395/652
5,568,641  10/1996  Nelson et al. ....................... 395/652

OTHER PUBLICATIONS

Postel, J. and Reynolds, J., ISI. *File Transfer Protocol (FTP)*, Oct. 1985, pp. 1–69.

Primary Examiner—Kevin A. Kriess
Attorney, Agent, or Firm—Jordan C. Powell

[57] ABSTRACT

A method of updating a software code in a cable communication system (10) involves the steps of receiving a notification (100) by a cable access unit (30). Next, the cable access unit (30) receives (110) the software code. After receiving (110) the software code the CAU (30) resets (114) and reboots using the software code.

7 Claims, 5 Drawing Sheets

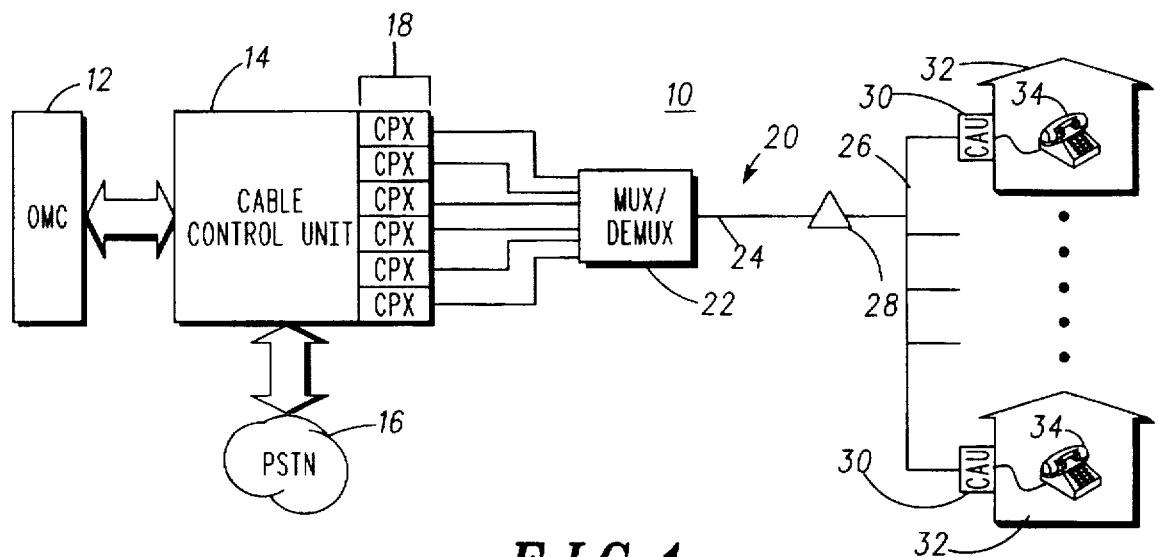
FIG.1
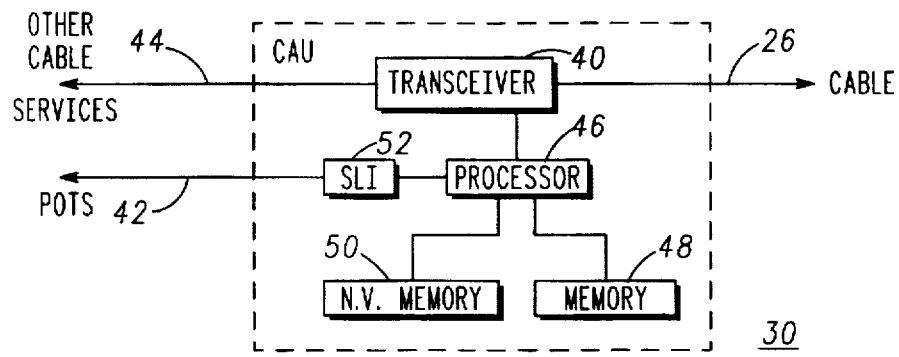
FIG.2
| BITS | | | | | | | | FC |
|---|---|---|---|---|---|---|---|---|
| 8 | 7 | 6 | 5 | 4 | 3 | 2 | 1 | OCTET |
| RESERVED | | | | $s_2$ | $s_1$ | CHANNEL TYPE | | 1 |
| MESSAGE PAYLOAD  [AC, SIG] | | | | | | | | 2 (CONT.) 18 |
| CHECKSUM(IF $s_2$= 1), OR MESSAGE PAYLOAD (IF $s_2$= 0) | | | | | | | | 19 20 |
220
222 — MESSAGE PAYLOAD
224 — [AC, SIG] — 226
FIG.11

CFTP WRITE REQUESST MESSAGE

| INFORMATION ELEMENTS | LENGTH | DESCRIPTION |
|---|---|---|
| MESSAGE TYPE | 1 | LAYER 3 MESSAGE IDENTIFIER |
| TRANSFER MODE | 3 | SPECIFIES FILE TYPE |
| VERSION | 14 | SOFTWARE VERSION NUMBER |

*FIG.6*

CFTP DATA BLOCK MESSAGE

| INFORMATION ELEMENTS | LENGTH | DESCRIPTION |
|---|---|---|
| MESSAGE TYPE | 1 | LAYER 3 MESSAGE IDENTIFIER |
| BLOCK NUMBER | 4 | SEQUENTIAL NUMBER IDENTIFYING DATA BLOCK |
| DATA BLOCK | 2 TO 252 | FIXED BLOCKS OF 252 BYTES WITH THE LAST DATA BLOCK BEING A LENGTH FROM 0 TO 251 |

*FIG.7*

CFTP ACK MESSAGE

| INFORMATION ELEMENTS | LENGTH | DESCRIPTION |
|---|---|---|
| MESSAGE TYPE | 1 | LAYER 3 MESSAGE IDENTIFIER |
| BLOCK NUMBER | 4 | SEQUENTIAL NUMBER IDENTIFYING DATA BLOCK |

*FIG.8*

CFTP ERROR MESSAGE

| INFORMATION ELEMENTS | LENGTH | DESCRIPTION |
|---|---|---|
| MESSAGE TYPE | 1 | LAYER 3 MESSAGE IDENTIFIER |
| CAUSE | 5 | REASON FOR REJECTING DATA BLOCK |

*FIG.9*

RESET MESSAGE

| INFORMATION ELEMENTS | LENGTH | DESCRIPTION |
|---|---|---|
| MESSAGE TYPE | 1 | LAYER 3 MESSAGE IDENTIFIER |
| VERSION | 14 | SOFTWARE VERSION NUMBER |

*FIG.10*

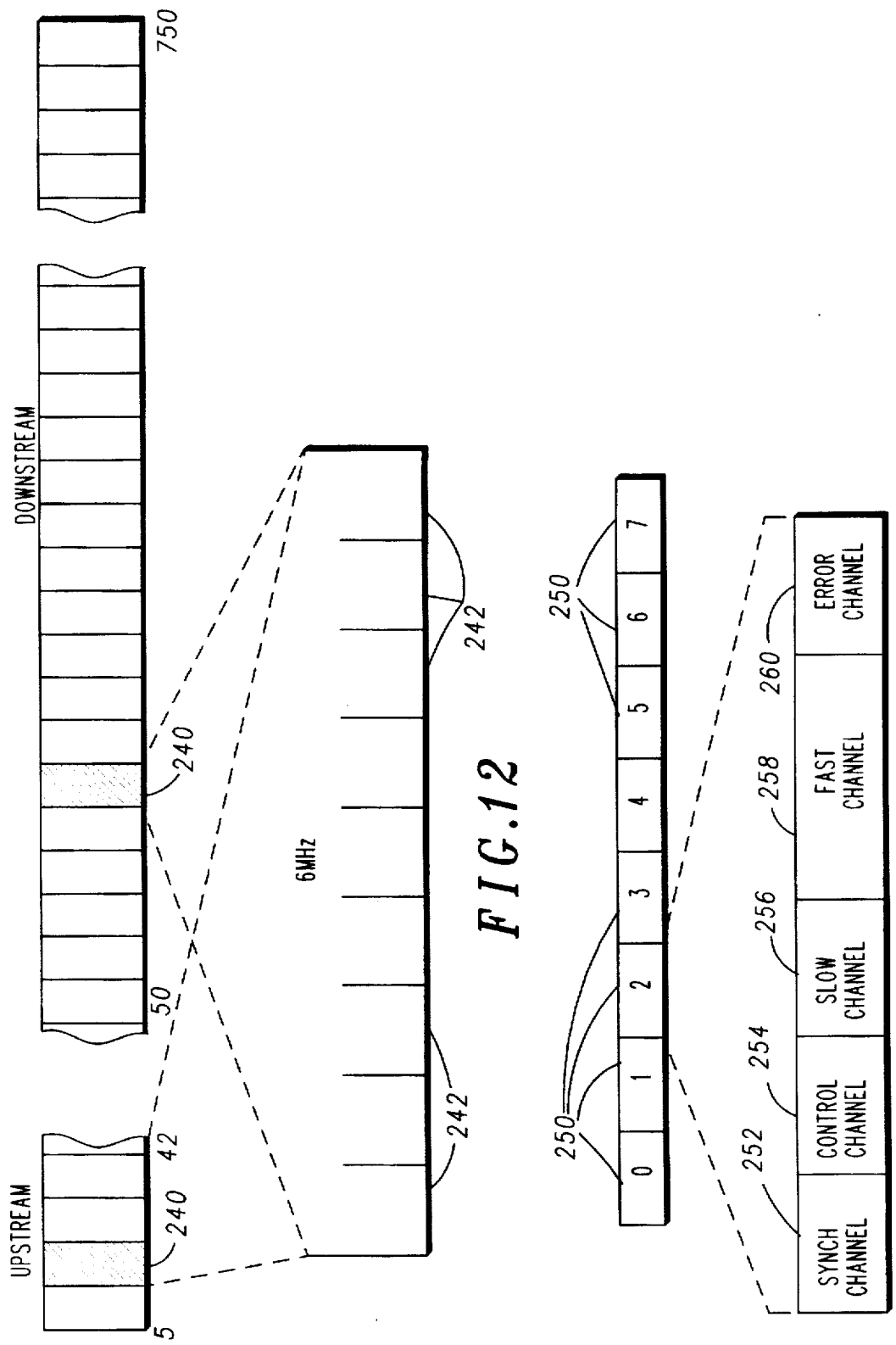

5,761,504

1

METHOD FOR UPDATING A SOFTWARE CODE IN A COMMUNICATION SYSTEM

FIELD OF THE INVENTION

The present invention relates generally to the field of communication systems and more particularly to a method of updating software code in a communication system.

BACKGROUND OF THE INVENTION

A modern digital communication system has pair of transceivers that transmit messages over a transmission medium. Each of the transceivers has an operating system that is typically stored in a memory. The operating system instructs the transceiver's how to react to overhead messages. For instances in a cable communication system, one of the transceivers involved in a communications session might detect that the communication channel is noisy. Based on this information the transceiver would send a transfer to new communications channel message to the other transceiver. This transfer message is an overhead message and the other transceiver has to know how to respond to continue the communication session. The operating system might instruct the other transceiver to tune to a predetermined alternate channel or it might instruct the other transceiver to tune to a system access channel that will designate an open channel for further communications.

Periodically the operating system of the transceivers may have to be updated to correct errors or add new features. In a typical cable communications system this requires the system operator to send out a technician to every premise with a transceiver. The technician then installs the new operating system in the premise transceiver. This is an extremely expensive and time consuming operation. As a result, the system operator is reluctant to add new features or correct errors in the subscribers premise transceiver. This is also true of other communication systems, such as cellular, mobile radio, wireless data and wide area networks.

Thus there exists a need for a method of updating a software code in a transceiver in a communication system, that is inexpensive and can be accomplished promptly.

BRIEF DESCRIPTION OF THE DRAWINGS

FIG. 1 is a block diagram of a cable communication system;

FIG. 2 a block diagram of a cable access unit;

FIGS. 6–10 are each a chart listing the features of a message used in the signal diagrams of FIGS. 2 and 3;

FIG. 11 is schematic diagram of a system broadcast channel;

FIG. 12 is a schematic diagram of the frequency allocation used in the cable communications system; and FIG. 13 is a schematic diagram of a time division multiplexing scheme used in the cable communication system.

DETAILED DESCRIPTION OF THE DRAWINGS

Figure 3:
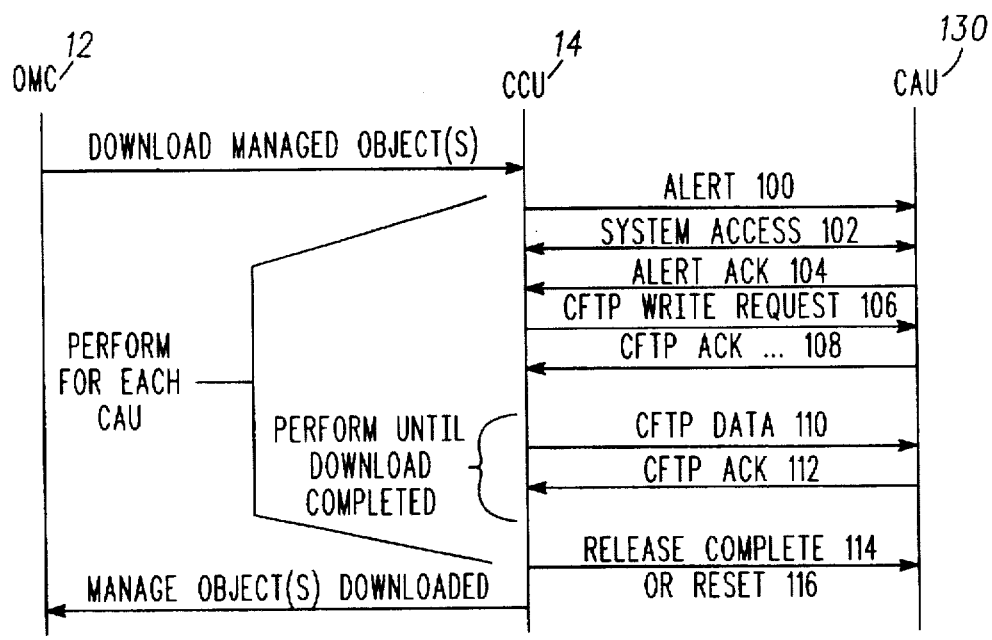
FIG. 3 is a signal diagram of a software code update.

In summary the invention provides a method for updating software code in a communication system. The method includes a protocol for downloading the software code and

2 rebooting using the software code. The invention is described in connection with a cable communications system, but is in no way limited to this application. The invention applies broadly to any communication system.

FIG. 1 is a block diagram of a cable communication system 10. An operations and management center (OMC) 12 controls and coordinates the overhead functions of the cable communication system 10. The OMC 12 is coupled to a cable control unit (CCU) 14 that acts as the interface between the cable communication system 10 and a public switched telephone network (PSTN) 16. The CCU 14 contains a number of cable port transceivers (CPX) 18. Each CPX 18 is capable of carrying on a communication session on one of the communication channels available on a fiber-coax hybrid cable plant 20. A multiplexer-demultiplexer (MUX/DEMUX) 22 combines the transmissions from the plurality of CPXs 18 onto the cable plant 20. The MUX/DEMUX 22 also breaks out and distributes the signals coming into the CPXs 18. The cable plant 20 is composed of a fiber optic cable 24, a coaxial cable 26 and an optical to electrical converter 28. The coaxial cable 26 fans out and is connect to a plurality of cable access devices (CAU) 30. The CAUs 30 are attached to the outside of a subscriber's premises 32. One of the CAU's 30 functions is to convert the radio frequency digital signals in the coaxial cable 26 to the analog signals used in a plain old telephone service (POTS) telephone 34.

FIG. 2 is a block diagram of the cable access unit (CAU, subscriber unit) 30. The CAU 30 has a transceiver 40 coupled to the coaxial cable 26. The transceiver 40 sends and receives signals from the cable 26. The transceiver 40 splits the signal from the cable 26 into a POTS signal 42 and a signal 44 intended for other services. These other services include an ISDN (integrated digital services network) basic rate interface (BRI) line, an ethernet line and an RS232 line. The transceiver 40 is coupled to a processor 46 that executes a software code (operating code, operating software) that controls the overhead functions of carrying on a communications session with one of the CPXs 18. The software code is stored in a memory 48. The memory 48 is divided into a first memory portion (active code bank, code bank, first portion of memory) and a second memory portion (designated code bank). A non-volatile memory 50 is coupled to the processor 46 and contains a pointer to the active code bank, a code version (version) and other information. The processor 46 is also coupled to a subscriber loop interface (SLI) 52. The SLI 52 converts the digital data into an analog signal 42 used in POTS.

In an alternative embodiment, the memory is divided into a plurality of code banks. The plurality of code banks are divided into active code bank and a back up code bank for each of the services: POTS, RS232, ethernet and BRI line. In another embodiment, the plurality of code banks are divided into an active operating system, containing an active driver for all the services, and a back up driver for each of the services in its own code bank.

Figure 4:
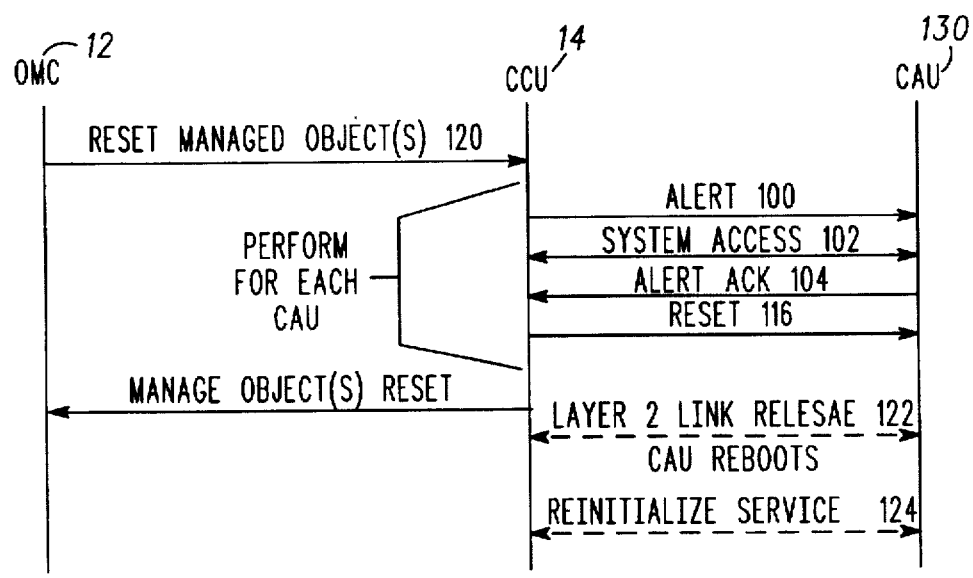
FIG. 4 is an alternative signal diagram of a software code update.

FIG. 3 is a signal diagram of a software code update. The OMC 12 has the job of ensuring that all the CAUs 30 have the latest version of the operating software (new operating software). When the OMC 12 determines that the CAUs' 30 software code needs to be updated, it downloads the software code to the CCU 14. In one embodiment the CCU 14 stores the software code for later downloading (caching) In another embodiment the CCU 14 immediately proceeds to download the software code to the CAUs 30. The CCU 14 sends out an alert (notification) 100 to the appropriate CAU 30 or group of CAUs 30. Every CAU 30 has an alert ID for the CAU box and one for each telephony line. When the CAU 30 receives an alert ID in the alert message that is associated with the CAU box it knows that the communication session that follows is concerned with the CAU's 30 internal operation and not a telephone call. The CAU 30 and the CCU 14 then perform a system access procedure 102. The CAU 30 then sends an alert acknowledgment (acknowledgment) 104. This response informs the CCU 14 that the CAU 30 received the alert message 100 and is ready to proceed. The CCU 14 responds with a write request (cable file transfer protocol {CFTP} write request) 106. This informs the CAU 30 that the CCU 14 is going to transfer a file. The CAU 30 responds with a CFTP acknowledgment 108. The CCU 14 then starts transferring data blocks or packets (CFTP data) 110. When each data packet is received error free the CAU 30 transmits a CFTP acknowledgment 112. This is repeated until the all the software code has been transferred to the CAU or CAUs 30. The CCU 14 will then send either a release 114 or a reset message 116. If the CCU 14 sends a release it will have to send a reset message 116 later to the CAU 30 and this is shown in FIG. 4. The CCU 14 then reports to the OMC 12 that the software code has been downloaded.

FIG. 4 shows a delayed reset and reboot of the CAU 30 using the new software code. The OMC 12 directs 120 the CCU 14 to have the CAU 30 reset and reboot using the new software code. The CCU 14 first transmits an alert 100 containing the alert ID associated with the CAU box. The CCU 14 and CAU 30 then perform a system access procedure 102. The CAU 30 responds with the alert acknowledgment 104. The CCU 14 sends the reset message 116 to the CAU 30. In an alternative embodiment the CAU 30 responds with a reset acknowledgment. The CCU 14 reports to the OMC 12 that the CAU 30 received the reset message. The CCU 14 and CAU 30 perform a layer 2 link release 122. The CAU 30 next performs a reboot and reinitializes service 124. When the CAU 30 reinitializes service it informs the CCU 14 of the version of the software code it is operating under.

The method of updating software code described herein is designed to avoid several potential pitfalls. The CAU 30 always has two different versions of the software operating code. One version is stored in high memory (first memory portion) and the other is stored in low memory (second memory portion). When the CCU 14 sends a write request 106 it includes information (designated memory bank) on whether to store the software code in the first memory portion or the second memory portion. A pointer in the non-volatile memory 50 indicates whether the first or the second memory portion is the active operating software code (active operating software). The CAU 30 will not over write the active software code. Any attempts by the CCU 14 to over write 106 the active software code with the new software code (new code version) results in an error message. This prevents the active software code (active code version) from being overwritten.

Figure 5:
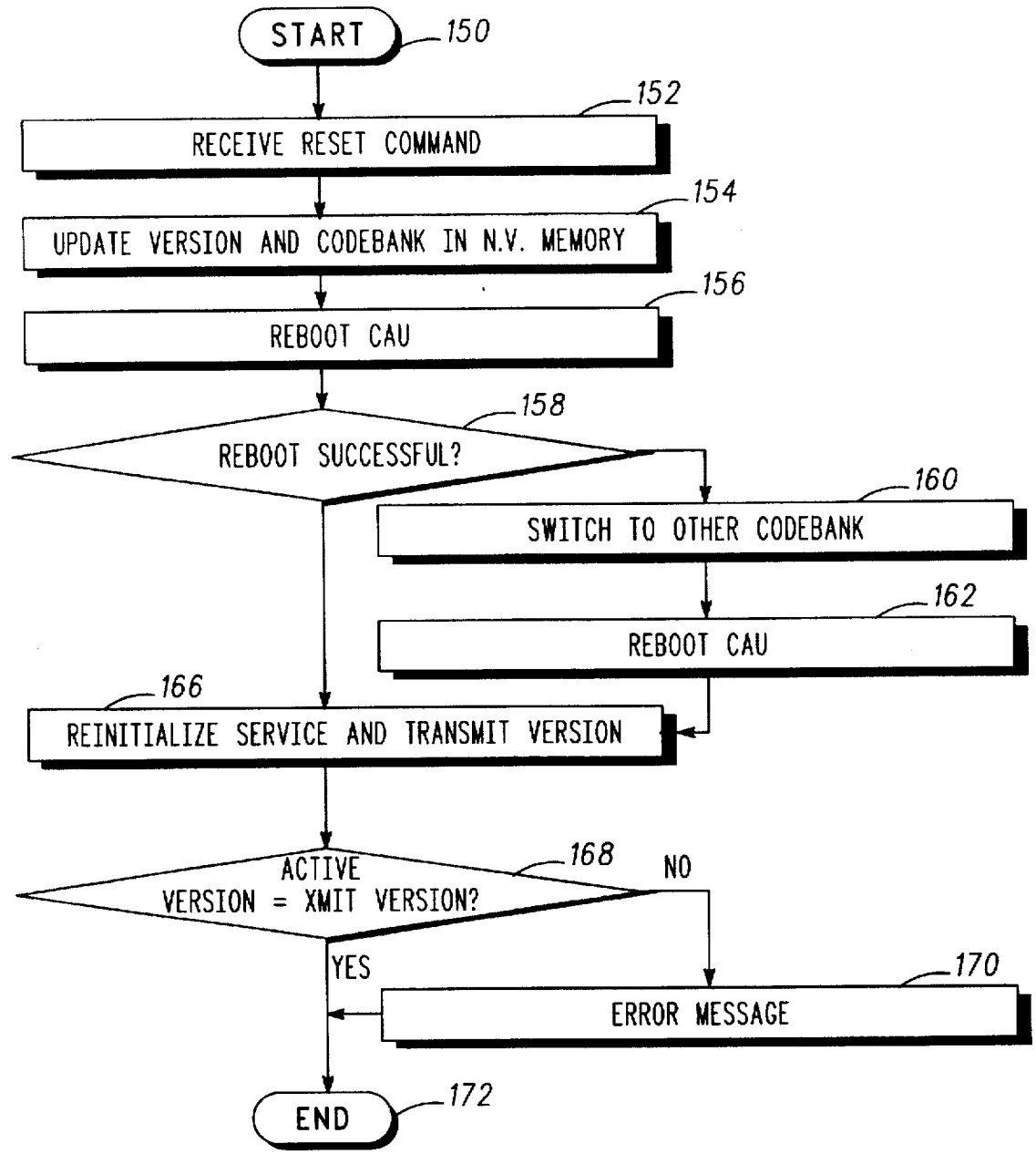
FIG. 5 is a flow diagram of a reset and reboot of a cable access unit using a new software code.

FIG. 5 is a flow diagram of the method of updating the software code. This method avoids the situation of the CAU 30 getting locked in a loop of repeatedly attempting to reboot from a damage software code. The process starts at step 150 with the CAU 30 receiving a reset command at step 152. The CAU 30 then updates its non-volatile memory with a version and a codebank of the new software code at step 154. At step 156 the CAU reboots using the new software code. When the reboot is unsuccessful at step 158, the CAU uses the other codebank (second code bank), containing the old software code (second software code), and updates the non-volatile memory with the second version, at step 160. The CAU reboots from the old software code at step 162. Since the CAU has been running under this old software code the CAU will reboot without any problem. The CAU reinitializes service and transmits the version of the software it is operating under at step 166. When the reboot at step 158 is successful the process skips to step 166. At step 168 the CCU compares the active version of the software code being used by the CAU with the version of the new software code it transmitted to the CAU. When the comparison at step 168 shows the two versions are not the same, an error message (error condition) is sent to the OMC, at step 170. The process then ends at step 172. When the comparison at step 168 shows the two versions of software code are the same, the process ends at step 172.

The process described in FIG. 5 ensures that if the new software code downloaded to the CAU 30 has a problem it does not disable the CAU 30. The CAU 30 always has a tested version of operating software code. If there is a problem in the new software, the CAU 30 uses the tested version of software code (second software code).

FIG. 6 is a table of the information provided in the CFTP write request message 106. The message type 200 identifies the message as a write request and requires 1 byte of data. The transfer mode 202 tells the CAU if the file type is binary, enciphered, compressed or in some other format. The version 204 contains a variety of information including an identifier, the length of the this version of software code and the designated code bank that the software code is to be stored in the CAU 30.

FIG. 7 is a table of the information provided in the CFTP data block message 110. The message type 200 identifies the message as a data block and requires 1 byte of data. The block number 206 identifies which block of data is being transferred. The data block 208 is the raw data being transferred and can be up to 252 bytes of data per data block message.

FIG. 8 is a table of the information provided in the CFTP acknowledgment message 108. The message type 200 identifies the message as an acknowledgment and requires 1 byte of data. The block number 206 identifies which block of data was last received.

FIG. 9 is a table of the information provided in the CFTP error message. The message type 200 identifies the message as an error message and requires 1 byte of data. The cause 210 explains why the error occurred.

FIG. 10 is a table of the information provided in the reset message 116. The message type 200 identifies the message as a reset message and requires 1 byte of data. The version (software version code, new software version code) 204 tells the CAU which version of software code to use when rebooting.

The invention is designed so that the software code can be downloaded while a telephone connection exists on the same CAU. This is made possible by two things. The first is that the alert IDs for the CAU boxes is different than the alert IDs for the telephone lines. The alert IDs are transmitted over a system broadcast channel. The structure of the system broadcast channel 220 is shown in FIG. 11. The system broadcast channel 220 includes in its message payload 222, an alert channel 224 and a system information channel (SIC) 226. The alert channel 224 carries the alert IDs (plurality of alert identifiers). The CCU can send an alert for either the CAU box or a telephony line associated with the CAU. When an alert is sent for either the associated telephone line or the CAU box, the CAU performs a system access and is instructed to tune to a traffic channel.

The traffic channel has a different carrier frequency than the system broadcast channel. FIG. 12 shows the frequency allocation used by the cable communication system. The upstream traffic (CAU to CCU) is confined between 5–42 MHz. The downstream traffic (CCU to CAU) is confined between 50–750 MHz. A 6 MHz block 240 of spectrum is divided into ten 600 KHz wide carriers 242. Each 600 KHz wide carrier 242 is divided into 8 time slots 250, see FIG. 13. Each time slot 250 is a traffic channel 250. A traffic channel 250 includes a synchronization channel 252, a control channel 254, a slow channel 256, a fast channel 258 and an error channel 260.

If a CAU is involved in a telephony connection (telephony communication) when the CCU is attempting to download the software code it sends the CAU box alert ID over the slow channel 256. The software code is then downloaded over one of the empty time slots 250 having the same carrier frequency as the traffic channel being used for the telephone connection. If a CAU is involved in a download when an incoming call is being placed to the associated telephone line, the CAU receives an alert over the slow channel 256 of the traffic channel the CCU is using to download the software. If the CAU attempts to place a call while a download of software code is occurring, the CAU will request access to a traffic channel over a system access channel. In all cases the CAU will have to use traffic channels having the same carrier frequency for the download and the telephone connection.

Thus there has been described a method for updating a software code in a communication system, that is inexpensive and is performed promptly. The method reduces the need for technicians to individually update every subscriber unit. In addition, the method does not interfere with on-going communication sessions and provides a fail safe mechanism in case of error in the new software code. While the invention has been described in conjunction with specific embodiments thereof, it is evident that many alterations, modifications, and alterations will be apparent to those skilled in the art in light of the foregoing description. Accordingly, it is intended to embrace all such alterations, modifications, and variations in the appended claims.

What is claimed is:

1. A method of updating a software code in a cable communication system, comprising the steps of:
   (a) receiving a notification;
      (a1) transmitting an acknowledgment;
      (a2) receiving a write request;
      (a3) determining a designated code bank to hold the software code;
      (a4) checking whether the designated code bank is equal to an active code bank,
      (a5) when the designated code bank is equal to the active code bank, rejecting the software code;
   (b) receiving the software code; and
   (c) resetting and rebooting using the software code.

2. The method of claim 1, wherein step (c) further includes the step of:
   (c1) receiving a reset command.

3. The method of claim 1, wherein step (iii) further includes the step of transmitting an error message.

4. The method of claim 1, further including the steps of:
   (iv) when the designated code bank is not equal to the active code bank, storing the software code in the designated code bank.

5. The method of claim 1, wherein step (a) further includes the steps of:
   (a1) determining if one of a plurality of alert identifiers received in the notification is associated with a cable access unit; and
   (a2) when one of the plurality of alert identifiers is associated with the cable access unit proceeding to step (b).

6. The method of claim 5, wherein step (a1) further including the steps of:
   (i) determining if one of the plurality of alert identifiers received in the notification is associated with a telephone call;
   (ii) when one of the plurality of alert identifiers is associated with the telephone call proceeding with a telephony connection.

7. The method of claim 1, wherein step (a) further includes the steps of:
   (a1) determining if one of a plurality of alert identifiers received in the notification is associated with a cable access unit; and
   (a2) when one of the plurality of alert identifiers is associated with the cable access unit and a second of the plurality of alert identifiers is associated with a telephony line, proceeding to step (b) and proceeding with a telephony connection.

* * * * *